(12) United States Patent
Cho et al.

(10) Patent No.: US 12,506,933 B2
(45) Date of Patent: Dec. 23, 2025

(54) IMAGE DISPLAY APPARATUS AND METHOD FOR CONTROLLING THE SAME

(71) Applicant: LG ELECTRONICS INC., Seoul (KR)

(72) Inventors: Eunyoung Cho, Seoul (KR); Miyeon Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/768,639

(22) Filed: Jul. 10, 2024

(65) Prior Publication Data
US 2025/0227337 A1 Jul. 10, 2025

(30) Foreign Application Priority Data
Jan. 9, 2024 (KR) .......................... 10-2024-0003727

(51) Int. Cl.
*H04N 21/472* (2011.01)
*H04N 21/431* (2011.01)

(52) U.S. Cl.
CPC ... *H04N 21/47205* (2013.01); *H04N 21/4316* (2013.01); *H04N 21/4318* (2013.01)

(58) Field of Classification Search
CPC ............ G06F 8/61; G06F 8/71; G06F 3/0482; H04N 21/443; H04N 21/4586
See application file for complete search history.

(56) References Cited

U.S. PATENT DOCUMENTS

| | | |
|---|---|---|
| 2011/0084899 A1 | 4/2011 | Jung et al. |
| 2013/0210488 A1 | 8/2013 | Lee et al. |
| 2016/0156959 A1 | 6/2016 | Lee et al. |
| 2018/0165081 A1* | 6/2018 | Rahman .................... G06F 8/71 |
| 2022/0091729 A1* | 3/2022 | Shah ...................... G06F 9/4856 |
| 2023/0376307 A1* | 11/2023 | Isert ......................... G06F 9/541 |

OTHER PUBLICATIONS

European Patent Office Application Serial No. 24206176.0, Search Report dated Mar. 5, 2025, 10 pages.

* cited by examiner

*Primary Examiner* — Nelson M Rosario
(74) *Attorney, Agent, or Firm* — LEE, HONG, DEGERMAN, KANG & WAIMEY (57) ABSTRACT

The present disclosure relates to an image display apparatus and a method of controlling the same. The image display apparatus according to one embodiment of the present disclosure includes a display, a network interface module configured to transceive data with a service apparatus, and a signal processing device configured to control the network interface module to receive information about a version of an application provided by the service apparatus, wherein, based on a request for executing an application, the signal processing device compares a version of the application installed on the image display apparatus to a version of the application installed on the service apparatus, and controls the network interface module to execute the application on an apparatus having an application with a higher version installed thereon, among the image display apparatus and the service apparatus, respectively.

15 Claims, 8 Drawing Sheets

IMAGE DISPLAY APPARATUS AND METHOD FOR CONTROLLING THE SAME

CROSS-REFERENCE TO RELATED APPLICATION

Pursuant to 35 U.S.C. § 119 (a), this application claims the benefit of earlier filing date and right of priority to Korean Patent Application No. 10-2024-0003727, filed on Jan. 9, 2024, the contents of which are all hereby incorporated by reference herein in their entireties.

TECHNICAL FIELD

This disclosure relates to an image display apparatus and a method of controlling the same.

BACKGROUND

An image display apparatus is an apparatus having a function of providing an image that may be viewed by a user. The user may watch broadcasts through the image display apparatus. The image display apparatus provides a broadcast selected by the user through broadcast signals transmitted from a broadcasting station, and a broadcast image of the broadcast is displayed on a display. At present, broadcasting is transitioning from analog broadcasting to digital broadcasting worldwide.

Digital broadcasting refers to broadcasting that transmits digital image and sound signals. Compared to the analog broadcasting, the digital broadcasting is resistant to external noise, and thus, has less data loss. The digital broadcasting has an advantage in error correction, and provides a high resolution and a clear screen. In addition, the digital broadcasting allows a bi-directional service unlike the analogue broadcasting.

Recently, there is an increasing number of image display apparatuses having an application independently installed thereon to display a function provided by the application.

In addition, there are also many cases when a service apparatus (or a set-top box) is connected to the image display apparatus and an application provided by the service apparatus is output to be provided to the image display apparatus.

In many cases, both the image display apparatus and the service apparatus may provide an application. Thus, there is also an increase in such cases that a same application is installed on both the image display apparatus and the service apparatus. However, in this case, a problem such that an apparatus which is to execute the application needs to be determined occurs increasingly.

SUMMARY

Therefore, an aspect of the present disclosure is to provide an image display apparatus capable of, when a same application is installed on the image display apparatus and a service apparatus, executing the application with a latest version and a method of controlling the image display apparatus.

Another aspect of the present disclosure is to provide an image display apparatus capable of displaying an application installed on the image display apparatus and a service apparatus using an optimized method, and a method of controlling the image display apparatus. Another aspect of the present disclosure is to provide an image display apparatus capable of executing and managing an application installed on the image display apparatus and a service apparatus using an optimized method, and a method of controlling the image display apparatus.

In order to achieve these and other advantages and in accordance with the purpose of this specification, as embodied and broadly described herein, there is provided an image display apparatus including: a display; a network interface module configured to transceive data with a service apparatus; and a signal processing device configured to control the network interface module to receive information about a version of an application provided by the service apparatus, wherein, based on a request for executing an application, the signal processing device compares a version of the application installed on the image display apparatus to a version of the application installed on the service apparatus, and controls the network interface module to execute the application on an apparatus having an application with a higher version installed thereon, among the image display apparatus and the service apparatus, respectively.

According to an embodiment, the signal processing device may identify the apparatus having the application with the higher version installed thereon, and output a graphic object to overlap an icon for the application with the higher version, the graphic object being configured to identify the apparatus having the application with the higher version installed thereon.

According to an embodiment, when the request for executing the application is received by selecting the icon, the signal processing device may control the application to be executed on the apparatus having the application with the higher version installed thereon.

According to an embodiment, the signal processing device may control the display to output an interface configured to display, on one screen, icons for applications installed on the image display apparatus and the service apparatus.

According to an embodiment, the signal processing device may compare a version of a first application installed on the service apparatus to a version of the first application installed on the image display apparatus, and when the version of the first application installed on the service apparatus is higher than the version of the first application on the image display apparatus, output a graphic object to overlap an icon for the first application, the graphic object being configured to identify an apparatus having the first application with the higher version installed thereon.

According to an embodiment, the signal processing device may be configured to: control the network interface module to execute the first application on the service apparatus having the first application with the higher version installed thereon, when the icon for the first application is selected; and output, to the display, an execution screen of the first application executed on the service apparatus.

According to an embodiment, when the execution of the first application is terminated, the signal processing device may control the display to output an interface again, the interface being configured to display icons for applications installed on the image display apparatus and the service apparatus on one screen.

According to an embodiment, the signal processing device may be configured to: output an interface including an icon for a second application installed on the service apparatus to the display; and in such a state that the second application is installed on the image display apparatus and the service apparatus, when a version of the second application installed on the image display apparatus is higher than a version of the second application on the service apparatus, output a graphic object configured to identify that the version of the second application installed on the image display apparatus is higher to overlap the icon for the second application, the icon being included in the interface.

According to an embodiment, the signal processing device may be configured to: execute the second application on the image display apparatus when the icon for the second application is selected, and output an execution screen of the second application to the display; and when the execution of the second application is terminated, output the interface including the icon for the second application installed on the service apparatus to the display again.

According to an embodiment, when a same application with a same version is installed on the image display apparatus and the service apparatus, the signal processing device may control the application to be executed on an apparatus which satisfies a preset condition, among the image display apparatus and the service apparatus.

According to an embodiment, when the same application with the same version is installed on the image display apparatus and the service apparatus, the signal processing device may control the application to be executed on an apparatus which supports a higher resolution, among the image display apparatus and the service apparatus.

According to an embodiment, when the same application with the same version is installed on the image display apparatus and the service apparatus, the signal processing device may control to execute the application installed on an apparatus which performs communication at a higher transmission rate, among the image display apparatus and the service apparatus.

According to an embodiment, when the same application with the same version is installed on the image display apparatus and the service apparatus, the signal processing device may control to execute the application installed on an apparatus set to have a priority of executing the application, among the image display apparatus and the service apparatus.

According to an embodiment, when the same application with the same version is installed on the image display apparatus and the service apparatus, the signal processing device may control to execute the application installed on an apparatus with a higher frequency of executing the application, among the image display apparatus and the service apparatus.

According to an embodiment, based on information about applications installed on the service apparatus and the applications installed on the image display apparatus, the signal processing device may display icons for the applications by grouping the icons to respectively indicate an apparatus having an application with a higher version installed thereon, among applications installed both on the service apparatus and the image display apparatus.

According to an embodiment, while the application is being executed on the apparatus having the application with the higher version installed thereon, the signal processing device may update the application on another apparatus having the application with a lower version installed thereon.

Effects of the Disclosure

According to the present disclosure, a control method of, when a same application is installed on an image display apparatus and a service apparatus, allowing to execute a latest version of the application may be provided.

In addition, the present disclosure may provide a new user interface capable of identifying an apparatus having a higher version of an application installed thereon, among applications installed on the image display apparatus 100 and the service apparatus.

In addition, the present disclosure may provide a user interface capable of displaying applications installed on the image display apparatus and the service apparatus using an optimized method.

In addition, the present disclosure may provide a new control method capable of, while a higher version of an application is being executed, updating a lower version of the application by controlling an apparatus having the lower version of the application installed thereon.

DETAILED DESCRIPTION

Hereinafter, embodiments disclosed herein will be described in detail with reference to the accompanying drawings, and the same or similar elements are designated with the same numeral references, regardless of the numerals in the drawings, and their redundant description will be omitted. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known technology or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

The image display apparatus described herein may include a mobile phone, a smartphone, a laptop computer, a digital broadcasting terminal, a personal digital assistant (PDA), a portable multimedia player (PMP), a navigation system, a slate PC, a tablet PC, an ultrabook, a wearable device, e.g., a watch-type terminal (a smartwatch), a glass-type terminal (smart glasses), a head mounted display (HMD), or the like.

However, it will be easily understood by those skilled in the art that the configuration according to the embodiments described herein, unless otherwise limited to a case of being applicable only to the image display apparatus, may be applied to stationary terminals such as digital TVs, desktop computers, digital signage, or the like.

Figure 1:
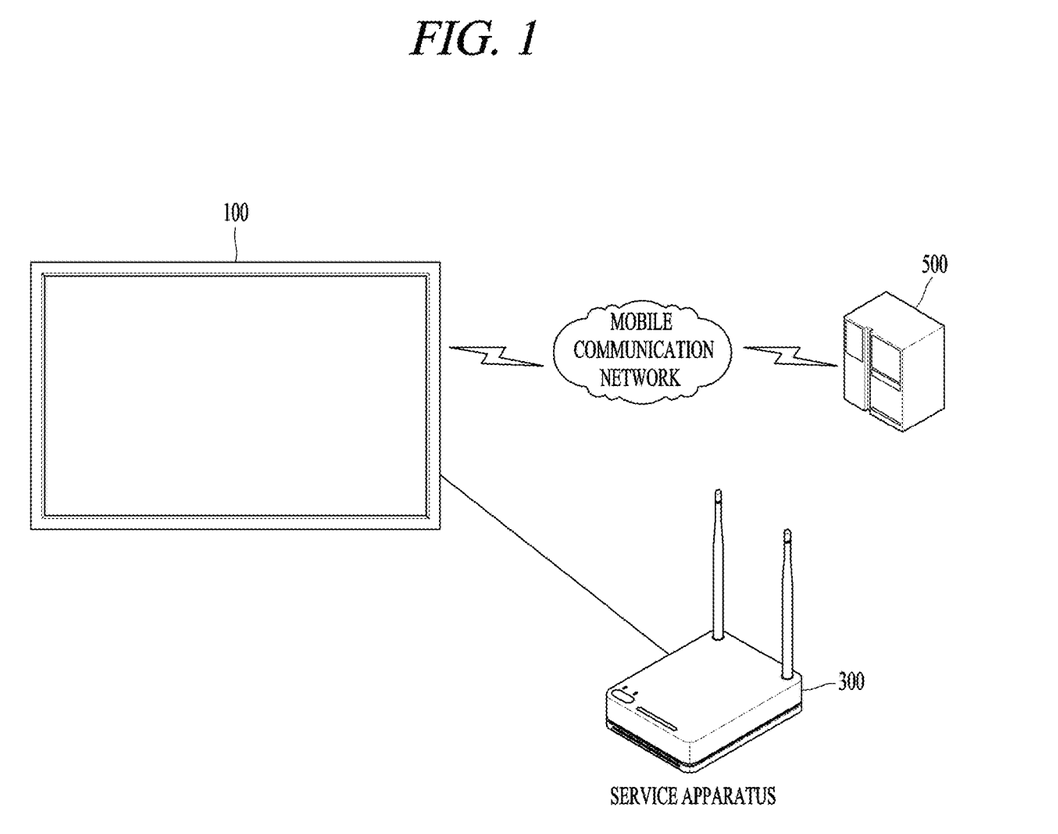
FIG. 1 is a diagram for explaining an environment including an image display apparatus according to an embodiment of the present disclosure.

FIG. 1 is a diagram for explaining an environment including an image display apparatus according to an embodiment of the present disclosure.

In the present disclosure, an image display apparatus 100 (or a TV), a service apparatus 300 connected to the image display apparatus 100 through wired/wireless communication technology to transceive various types of content such as a digital image, a broadcast, an application, etc., and a server 500 configured to communicate with the image display apparatus 100 through a mobile communication network may be included.

The image display apparatus 100 may be wiredly or wirelessly connected to the service apparatus 300. For example, in a case of the wired connection, high-definition multimedia interface (HDMI) technology may be used to perform connection, and in a case of the wireless connection, wireless-fidelity (Wi-Fi) technology or Bluetooth technology (or Blu-ray technology) may be used to perform connection.

The service apparatus 300 may receive content from a content provider (a service provider) through a mobile communication network (or Internet) and output the content through the image display apparatus 100. The service apparatus 300 may be a set-top box, a dongle, or a media station.

The service apparatus 300 (the set-top box) may refer to a product which receives and displays a broadcast that may not be received independently by a receiver of a television (an image display apparatus) such as a cable/satellite broadcast or an Internet streamed broadcast.

Here, the content described herein may include all types of information that may be output from an image display apparatus, such as applications, digital broadcasts, web, photos, moving images, etc.

The image display apparatus 100 may provide various content through the service apparatus 300, but may also receive content directly from the external server 500 through a mobile communication network and output the content.

Here, the external server 500, as an example, is a server operated by a company that manufactures the image display apparatus 100 and may provide various content.

The image display apparatus 100 may install an application or update a version through the server 500, and may also receive various content such as digital broadcasts directly from the server 500 and output the various content.

Hereinafter, for convenience of description, an application among content is described as an example.

As applications may be installed on the image display apparatus 100 and the service apparatus 300, respectively, a list or versions of applications installed on the image display apparatus 100 may be different from a list or versions of those installed on the service apparatus 300.

A customer using an old image display apparatus may not use a latest control panel (CP) application or a new webOS application through a home launcher of the image display apparatus.

Additionally, there is also a case when an image display apparatus provides an application that is not provided by a service apparatus.

For example, in such a case that a version 0.0.15 of a Netflix application is installed on an image display apparatus and a version 1.2.4 of a Netflix application is installed on a service apparatus, when a user executes the Netflix application of the image display apparatus, an older version of the application is executed. Thus, there is a problem such that a latest optimized application may not be used.

Although a Sport Alert application is installed on an image display apparatus, when the corresponding application is not provided to a service apparatus, a customer who executes the application only on the service apparatus may have less opportunities to access the Sport Alert application.

To solve this problem, the image display apparatus 100 in the present disclosure may check lists of applications provided by the image display apparatus 100 and the service apparatus 300, respectively.

In addition, the image display apparatus 100 may check an application that is installed on the image display apparatus 100 but not in the service apparatus 300, and then, provide an icon for executing the application to a home launcher of the service apparatus 300.

Then, when the corresponding icon is clicked, the image display apparatus 100 may switch an input to the image display apparatus 100, and execute the application of the image display apparatus 100 by deep-linking to the application.

In addition, after checking an application installed on the service apparatus 300 but not in the image display apparatus 100, the image display apparatus 100 may provide an icon for executing the application to a TV home launcher.

Then, when the corresponding icon is clicked, the image display apparatus 100 may switch an input to the service apparatus 300, and execute the application of the service apparatus 300 by deep-linking to the application.

When an application is installed on both a TV and the service apparatus 300, the image display apparatus 100 may check a version of the application in each of the TV and the service apparatus 300 to control to execute a latest version of the application when an application icon in the home launcher of the service apparatus 300 or the image display apparatus 100 is clicked.

When the executed application is terminated, the image display apparatus 100 may control to output a home launcher of an apparatus in which the home launcher was executed (upon termination of the application, a home launcher of the service apparatus 300 is output when the application was executed at the home launcher of the service apparatus 300, or a TV home launcher of the image display apparatus 100 is output when the application was executed at the TV home launcher).

Hereinafter, a method of displaying and executing an application installed on an image display apparatus and a service apparatus in an optimized manner is described in detail with reference to the attached drawings.

Figure 2:
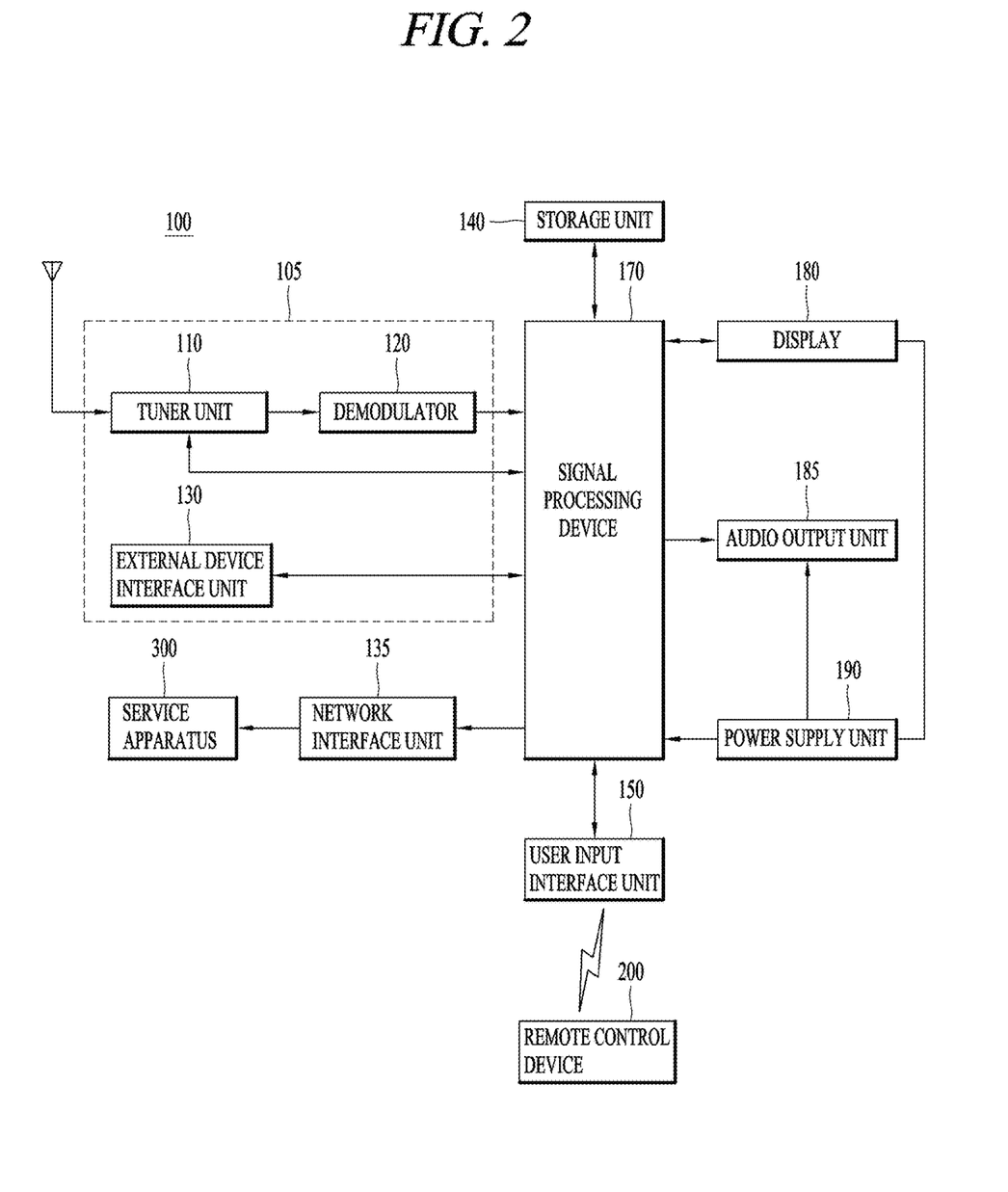
FIG. 2 is a block diagram for explaining the image display apparatus according to an embodiment of the present disclosure.
Figure 3:
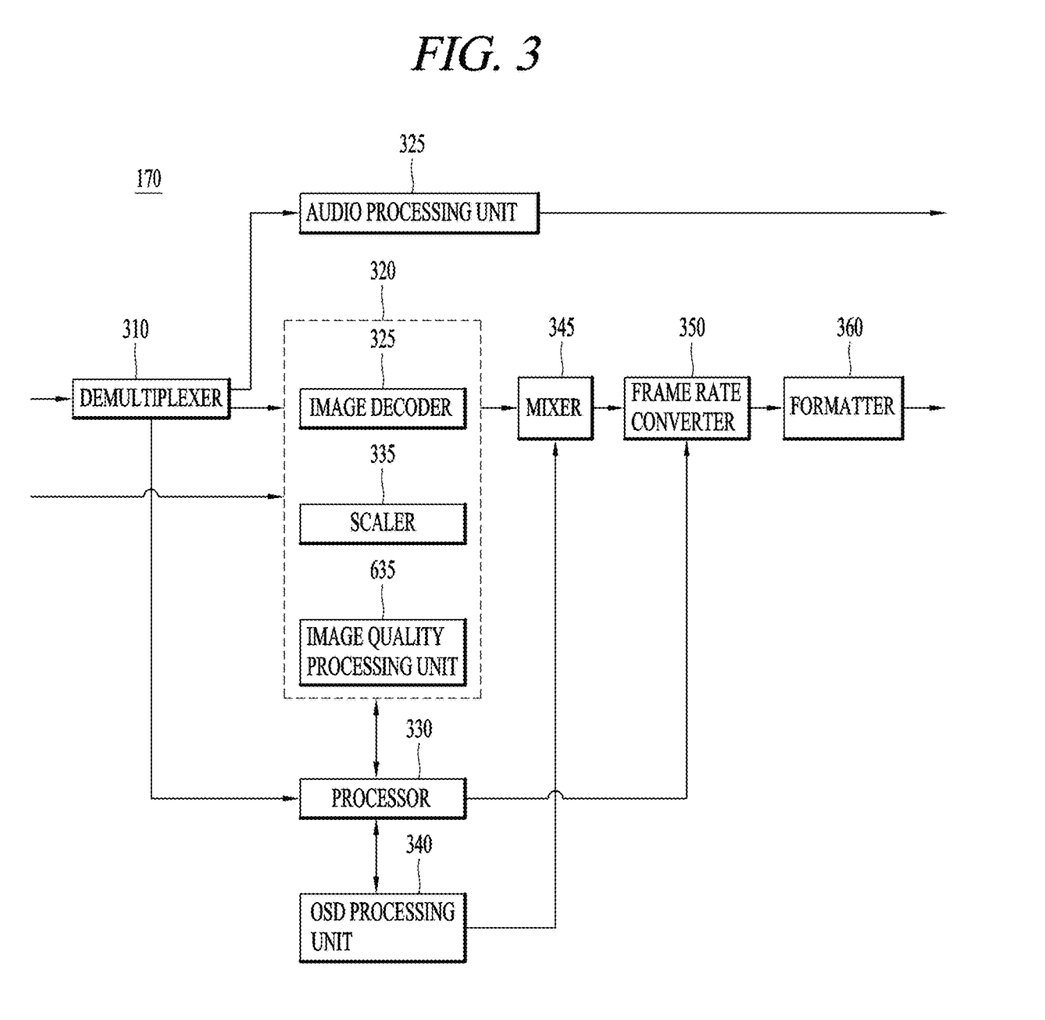
FIG. 3 is a block diagram for explaining a signal processing device according to an embodiment of the present disclosure.

FIG. 2 is a block diagram for explaining the image display apparatus 100 according to an embodiment of the present disclosure. FIG. 3 is a block diagram for explaining a signal processing device according to an embodiment of the present disclosure.

Referring to FIG. 2, the image display apparatus 100 according to an embodiment of the present disclosure may include an image receiver 105, an external device interface module 130, a network interface module 135, a storage 140, and a user input interface module 150, a sensor (not shown), a signal processing device 170, a display 180, and an speaker 185.

The image receiver 105 may receive an input image. For example, the image receiver 105 may receive an external input image such as a broadcast image, an HDMI image, or a streamed image.

The image receiver 105 may include a uni 110, a demodulator 120, and an external device interface module 130.

Meanwhile, unlike the drawing, the image receiver 105 may also include the tuner 110, the demodulator 120, the external device interface module 130, and a network interface module 135.

The tuner 110 selects a radio frequency (RF) broadcast signal corresponding to a channel selected by a user or all previously stored channels among RF broadcast signals received through an antenna (not shown). In addition, the selected RF broadcast signal is converted into an intermediate frequency signal, or a baseband image or audio signal.

Meanwhile, the tuner 110 may include a plurality of tuners to receive broadcast signals of a plurality of channels. Alternatively, a single tuner configured to simultaneously receive a broadcast signal from the plurality of channels may be included.

The demodulator 120 receives a digital intermediate frequency (DIF) signal converted by the tuner 110 to perform a demodulation operation.

The demodulator 120 may perform demodulation and channel decoding, and then, output a stream signal (TS). In this case, the stream signal may be a signal in which an image signal, a sound signal, or a data signal is multiplexed.

The stream signal output from the demodulator 120 may be input to the signal processing device 170. The signal processing device 170 performs demultiplexing, image/audio signal processing, etc., and then, outputs an image to the display 180 and sound to the speaker 185.

The external device interface module 130 may transmit or receive data with a connected external device (not shown), for example, a set-top box 50.

To do so, the external device interface module 130 may include an audio/video (A/V) input/output module (not shown), a wireless transmitter/receiver (not shown), etc.

The external device interface module 130 may be wiredly/wirelessly connected to an external device such as a digital versatile disk (DVD) player, a Blu-ray player, a game device, a camera, a camcorder, a computer (a laptop computer), a set-top box, etc., and perform an input/output operation with the external device.

The A/V input/output module in the external device interface module 130 may receive an image signal and an audio signal from the external device. Meanwhile, the wireless transmitter/receiver (not shown) in the external device interface module 130 may perform short-range wireless communication with other electronic devices.

Through the wireless transmitter/receiver (not shown), the external device interface module 130 may exchange data with an adjacent mobile terminal. Particularly, the external device interface module 130 may receive device information, information about an application being executed, an application image, etc. from a mobile terminal in a mirroring mode.

The network interface module 135 provides an interface module configured to connect the image display apparatus 100 to a wired/wireless network including an Internet network. For example, the network interface module 135 may receive content or data provided by the Internet, or a content provider, or a network operator through a network.

Meanwhile, the network interface module 135 may include a wireless transmitter/receiver (not shown).

The storage 140 may store a program for processing and controlling each signal in the signal processing device 170, and store an image, sound, a data signal, or the like which is signal processed.

In addition, the storage 140 may perform a function of temporarily storing an image, sound, or data signal each input to the external device interface module 130. In addition, the storage 140 may store information about a certain broadcast channel through a function of memorizing a channel such as a channel map.

Although FIG. 2 illustrates an embodiment in which the storage 140 is included separately from the signal processing device 170, a scope of the present disclosure is not limited thereto. The storage 140 may be included in the signal processing device 170.

The user input interface module 150 transmits a signal to the signal processing device 170 when the signal is input by a user, or transmits a signal to the user when the signal is transmitted from the signal processing device 170.

For example, the user input interface module 150 may transmit/receive a user input signal for power on/off, channel selection, a screen setting, etc. from a remote control device 200, or transmit a user input signal to the signal processing device 170 when the user input signal is input from a power key, a channel key, a volume key, or a local key (not shown) for a set value, etc., or transmit a user input signal to the signal processing device 170 when the user input signal is input from a sensor (not shown) configured to sense a gesture of a user, or transmit a signal to the sensor (not shown) when the signal is transmitted from the signal processing device 170.

The signal processing device 170 may demultiplex an input stream or process a demultiplexed signal through the tuner 110, the demodulator 120, the network interface module 135, or the external device interface module 130 to generate and output a signal for outputting an image or sound.

For example, the signal processing device 170 may receive a broadcast signal or an HDMI signal from the image receiver 105 and perform signal processing based on the received broadcast signal or HDMI signal to output a signal-processed image signal.

An image signal image-processed by the signal processing device 170 may be input to the display 180 and displayed as an image corresponding to the image signal. In addition, the image signal image-processed by the signal processing device 170 may be input to an external output device through the external device interface module 130.

A sound signal processed by the signal processing device 170 may be output as sound to the speaker 185. In addition, the sound signal processed by the signal processing device 170 may be input to an external output device through the external device interface module 130.

Although not shown in FIG. 2, the signal processing device 170 may include a demultiplexer, an image processor, etc. That is, the signal processing device 170 may perform various signal processing and, accordingly, may be implemented in a form of a system on chip (SOC). This will be described later with reference to FIG. 3.

In addition, the signal processing device 170 may control all operations in the image display apparatus 100. For example, the signal processing device 170 may control the tuner 110 to select (tune) an RF broadcast corresponding to a channel selected by a user or a pre-stored channel.

In addition, the signal processing device 170 may control the image display apparatus 100 by a user command input through the user input interface module 150 or by an internal program.

Meanwhile, the signal processing device 170 may control the display 180 to display an image. In this case, the image displayed on the display 180 may be a still image or a moving image, and may be a two-dimensional (2D) image or a three-dimensional (3D) image.

Meanwhile, the signal processing device 170 may display a certain object in the image displayed on the display 180. For example, the object may be at least one of an accessed web screen (newspaper, a magazine, etc.), an electronic program guide (EPG), various menus, a widget, an icon, a still image, a moving image, and text.

Meanwhile, the signal processing device 170 may recognize a location of a user based on an image captured by a camera (not shown). For example, a distance (a z-axis coordinate) between the user and the image display apparatus 100 may be identified. Besides, an x-axis coordinate and a y-axis coordinate in the display 180 corresponding to the location of the user may be identified.

The display 180 generates a driving signal by converting an image signal, a data signal, an on-screen control (SOD) signal, or a control signal each processed by the signal processing device 170 or an image signal, a data signal, a control signal, etc. each received from the external device interface module 130.

Meanwhile, the display 180 may be configured as a touch screen to be used as an input device other than an output device.

The speaker 185 receives a signal sound-processed by the signal processing device 170 and outputs the sound-processed signal as sound.

The camera (not shown) captures an image of a user. The camera (not shown) may be implemented as one camera, but is not limited thereto. The camera (not shown) may be implemented as a plurality of cameras. Information of an image captured by the camera (not shown) may be input to the signal processing device 170.

The signal processing device 170 may detect a gesture of the user based on the image captured by the camera (not shown), a signal detected from the sensor (not shown), or a combination thereof.

The signal processing device 170 may be implemented in a form of an SOC.

The power supplier 190 supplies corresponding power through a whole of the image display apparatus 100. In particular, the power supplier 190 may supply power to the signal processing device 170 implemented in the form of an SOC, the display 180 configured to display an image, the speaker 185 configured to perform audio output, etc.

In detail, the power supplier 190 may include a converter configured to convert alternating current power to direct current (DC) power and a DC-DC converter configured to convert a level of DC power.

The remote control device 200 transmits a user input to the user input interface module 150. To do so, the remote control device 200 may use Bluetooth, radio frequency (RF) communication, infrared (IR) communication, ultra wideband (UWB), a ZigBee method, etc. In addition, the remote control device 200 may receive an image, sound, or a data signal each output by the user input interface module 150 to be displayed on or output as sound to the remote control device 200.

Meanwhile, the image display apparatus 100 described above may be a fixed or mobile digital broadcasting receiver capable of receiving digital broadcasts.

Meanwhile, the block diagram of the image display apparatus 100 shown in FIG. 2 is a block diagram according to one embodiment of the present disclosure. Respective components in the block diagram may be combined, added, or omitted depending on a specification of the image display apparatus 100 that is actually implemented. That is, configuration may be made such that two or more components may be combined into one component or one component may be subdivided into two or more components as needed. In addition, functions performed in each block are to describe embodiments of the present disclosure, and particular operations or devices according to the functions do not limit the scope of the present disclosure.

FIG. 3 illustrates an example of an internal block diagram of the signal processing device 170 of FIG. 2.

Referring to the drawing, the signal processing device 170 according to an embodiment of the present disclosure may include a demultiplexer 310, an image processor 320, a processor 330, and an audio processor 370. In addition, a data processor (not shown) may be further included.

The demultiplexer 310 demultiplexes an input stream. For example, when a moving picture experts group (MPEG)-2 transport stream (TS) is input, the MPEG-2 TS may be demultiplexed and divided into an image signal, a sound signal, and a data signal. Here, a stream signal input to the demultiplexer 310 may be a stream signal output from the tuner 110, the demodulator 120, or the external device interface module 130.

The image processor 320 may perform signal processing on an input image. For example, the image processor 320 may perform image processing on the image signal obtained by demultiplexing by the demultiplexer 310.

To do so, the image processor 320 may include an image decoder 325, a scaler 335, an image quality processor 635, an image encoder (not shown), an OSD processor 340, a frame rate converter 350, a formatter. 360, etc.

The image decoder 325 decodes the image signal obtained by the demultiplexing, and the scaler 335 performs scaling to allow to output a resolution of the decoded image signal to the display 180.

The image decoder 325 may include a decoder of various standards. For example, an MPEG-2 decoder, an H.264 decoder, a 3D image decoder for a color image and a depth image, a decoder for decoding an image having a plurality of viewpoints, or the like may be included.

The scaler 335 may scale an input image signal obtained by completing the decoding of the image signal by the image decoder 325, etc.

For example, the scaler 335 may upscale the input image signal when a size or resolution of the input image signal is small, and downscale the input image signal when a size or resolution of the input image signal is great.

The image quality processor 635 may perform image quality processing on the input image signal obtained by completing the decoding of the image signal by the image decoder 325, etc.

For example, the image quality processor 635 may perform noise removal processing on the input image signal, expand a resolution of gradation with respect to the input image signal, perform image resolution enhancement, perform signal processing based on a high dynamic range (HDR), vary a frame rate, or perform image quality processing corresponding to characteristics of a panel, particularly, an organic light emitting panel.

The OSD processor 340 generates an OSD signal according to a user input or independently. For example, a signal for displaying various information as graphics or text on a screen of the display 180 may be generated based on a user input signal. The generated OSD signal may include various data such as a user interface screen, various menu screens, widgets, and icons on the image display apparatus 100. In addition, the generated OSD signal may include a 2D object or a 3D object.

In addition, the OSD processor 340 may generate a pointer that may be displayed on a display based on a pointing signal input from the remote control device 200. Particularly, the pointer may be generated by a pointing signal processing device, and the OSD processor 340 may include the pointing signal processing device (not shown). The pointing signal processing device (not shown) may be included separately, instead of being included in the OSD processor 340.

The frame rate converter (FRC) 350 may convert a frame rate of an input image. Meanwhile, the frame rate converter 350 may also output the input image without separately converting the frame rate.

Meanwhile, the formatter 360 may change a format of the input image signal into an image signal for display on a display and output the image signal.

Particularly, the formatter 360 may change the format of the image signal to correspond to a display panel.

Meanwhile, the formatter 360 may change a format of the image signal. For example, a format of a 3D image signal may be changed into one format among various 3D formats, such as a side-by-side format, a top/down format, a frame sequential format, an interlaced format, a checker box format, etc.

The processor 330 may control all operations in the image display apparatus 100 or the signal processing device 170.

For example, the processor 330 may control the tuner 110 to select (tune) an RF broadcast corresponding to a channel selected by a user or a pre-stored channel.

In addition, the processor 330 may control the image display apparatus 100 by a user command input through the user input interface module 150 or by an internal program.

In addition, the processor 330 may perform control of data transmission with the network interface module 135 or the external device interface module 130.

In addition, the processor 330 may control operations of the demultiplexer 310, the image processor 320, etc. in the signal processing device 170.

Meanwhile, the audio processor 370 in the signal processing device 170 may perform sound processing on the sound signal obtained by the demultiplexing. To do so, the audio processor 370 may include various decoders.

In addition, the audio processor 370 in the signal processing device 170 may process bass, treble, volume control, etc.

The data processor (not shown) in the signal processing device 170 may perform data processing on the data signal obtained by the demultiplexing. For example, when the data signal obtained by the demultiplexing is an encoded data signal, the data signal obtained by the demultiplexing may be decoded. The encoded data signal may be electronic program guide information including broadcast information such as start time, end time, etc. of broadcast programs broadcast in respective channels.

Meanwhile, the block diagram of the image processing apparatus 170 shown in FIG. 3 is a block diagram according to one embodiment of the present disclosure. Respective components in the block diagram may be combined, added, or omitted depending on a specification of the signal processing apparatus 170 that is actually implemented.

Particularly, the frame rate converter 350 and the formatter 360 may be included separately in addition to the image processor 320.

Hereinafter, a method of displaying and executing applications installed on an image display apparatus and a service apparatus in an optimized manner is described in detail with reference to the attached drawings.

Figure 4:
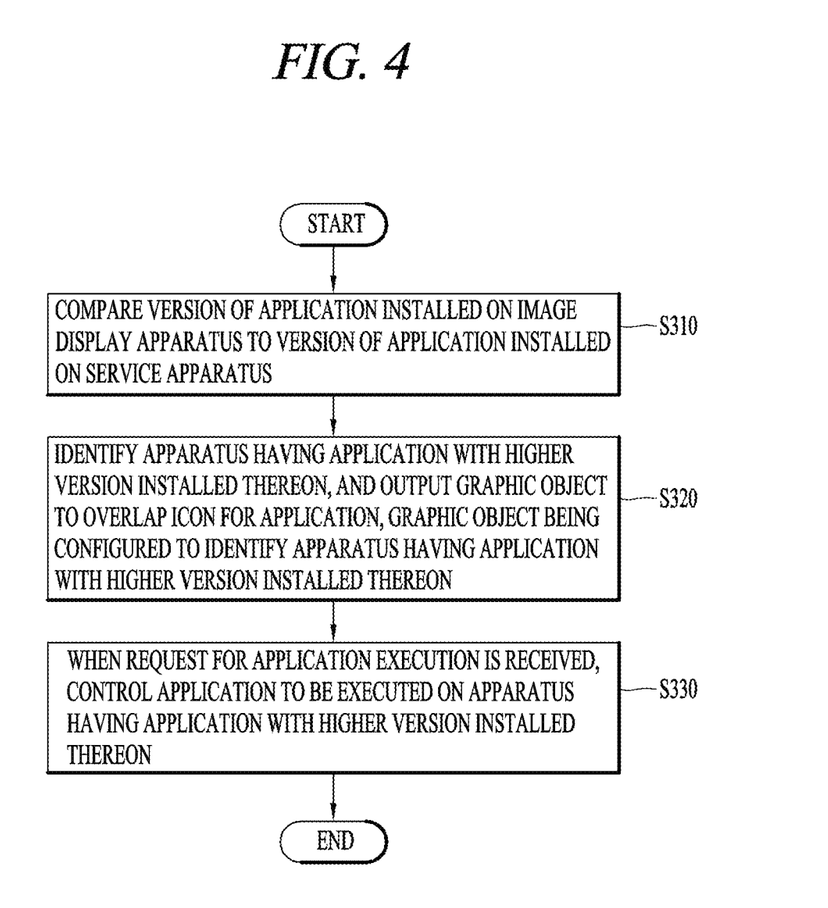
FIG. 4 is a flowchart for explaining a control method representative in the present disclosure.

FIG. 4 is a flowchart for explaining a control method representative in the present disclosure. FIGS. 5 to 8 are conceptual diagrams for explaining the control method described with reference to FIG. 4.

The image display apparatus 100 in the present disclosure includes the display 180, the network interface module 135 configured to transceive data with the service apparatus 300, and the signal processing device 170 configured to control the network interface module 135 to receive version information of an application provided by the service apparatus 300.

Based on a request for executing an application, the signal processing device 170 may compare a version of the application installed on the image display apparatus 100 to that of the application installed on the service apparatus 300, and control the network interface module 135 to execute the application with a higher version on an apparatus having the application with a higher version installed thereon, among the image display apparatus 100 and the service apparatus 300.

The signal processing device 170 may compare the version of the application installed on the image display apparatus 100 to that of the application installed on the service apparatus 300 (S310). In this case, the signal processing device 170 may compare the versions of the application requested to be executed according to reception of the request for application execution. Alternatively, when the service apparatus 300 is connected to the image display apparatus 100, or at certain intervals, or upon a user request, the signal processing device 170 may compare the version of the application installed on the image display apparatus 100 to that of the application installed on the service apparatus 300.

That is, comparison of versions of applications may be determined or changed by a user setting.

In addition, the signal processing device 170 may identify an apparatus having the application with a higher version installed thereon, and output a graphic object to overlap an icon for the application, the graphic object being configured to identify the apparatus having the application with a higher version installed thereon (S320).

Then, when a request for executing the corresponding application is received (when a request for executing the application is received by selecting the icon overlapping the graphic object), the signal processing device 170 may control the application to be executed on the apparatus having the application with a higher version installed thereon (S330).

For example, in a state when a first application is installed on both the image display apparatus 100 and the service apparatus 300, when versions of the first application installed thereon are compared to each other and the version of the first application installed on the image display apparatus 100 is higher, the signal processing device 170 may execute the first application on the image display apparatus 100.

As another example, in a state when a first application is installed on both the image display apparatus 100 and the service apparatus 300, when versions of the first application installed thereon are compared to each other and the version of the first application installed on the service apparatus 300 is higher, the signal processing device 170 may execute the first application on the service apparatus 300.

In this case, the signal processing device 170 may perform input switching or deep-link connection to output an execution screen of the first application executed on the service apparatus 300 to the display 180 of the image display apparatus 100.

Deep-link technology may refer to a technology that helps a user in a mobile environment to execute an application linked to a uniform resource locator (URL) and move to a particular page when the user clicks the URL on a website or another application.

In the present disclosure, performing a deep link connection may mean that, when execution of an application is requested by selecting an icon for the application in an environment of an image display apparatus, the application is executed on a service apparatus and an execution screen on the service apparatus is output to a display of the image display apparatus.

Conversely, performing a deep link connection in the present disclosure may mean that, when execution of an application on an image display apparatus is requested in a state when a home launcher of a service apparatus is output (that is, in a state when the service apparatus is set as an input apparatus for the image display apparatus), the application on the image display apparatus is executed in a state in which the service apparatus is set as an input device, and an execution screen of the application is output to a display of the image display apparatus.

Figure 5:
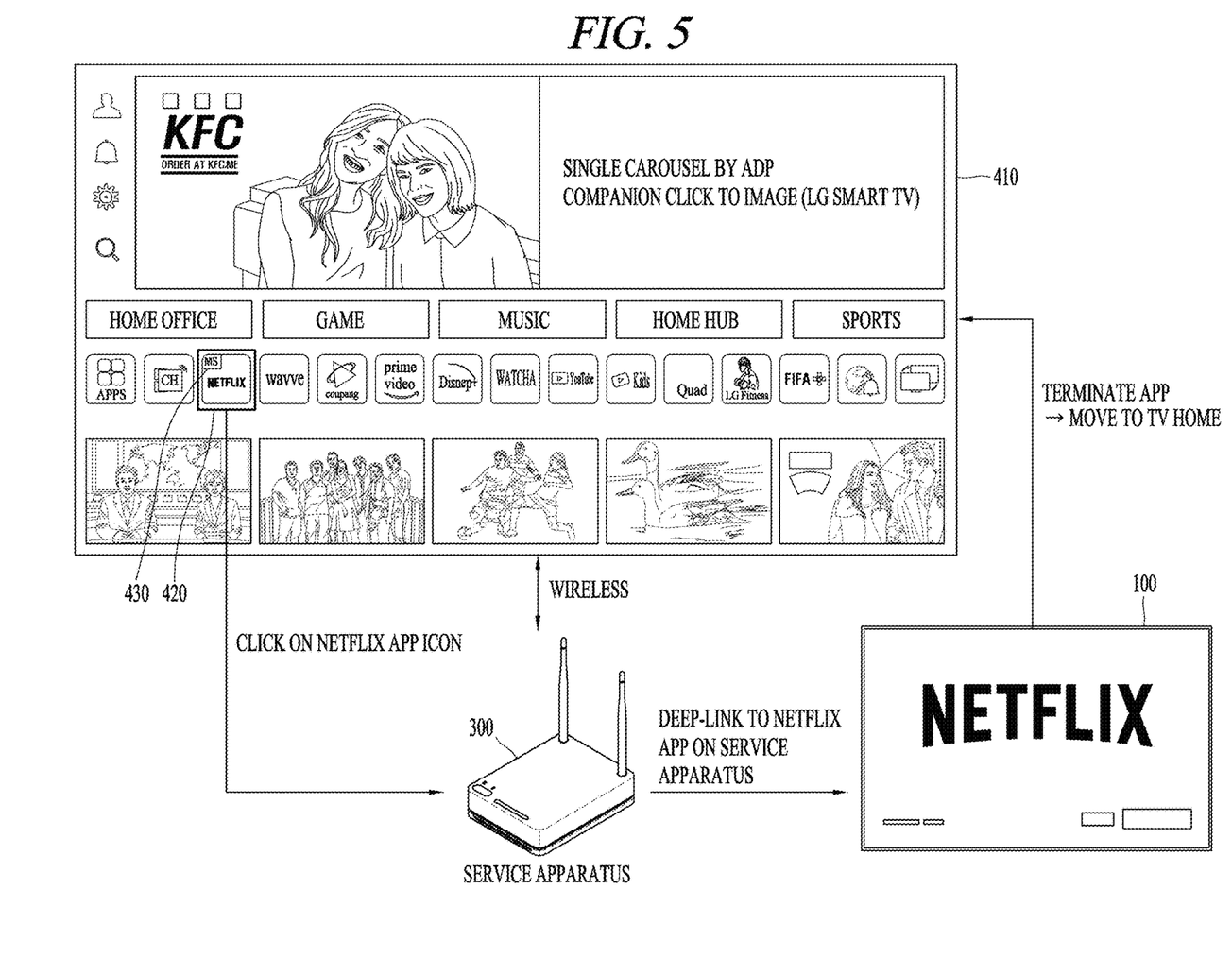
FIGS. 5, 6, 7, and 8 are conceptual diagrams for explaining the control method described with reference to FIG. 4.

Referring to FIG. 5, the signal processing device 170 may control the display 180 to output an interface 410 configured to display (output) icons for applications installed on the image display apparatus 100 and the service apparatus 300 on one screen.

The interface 410 may be a home launcher provided by the image display apparatus 100 or a home launcher provided by the service apparatus 300.

The interface 410 may include icons for at least some of applications installed on the image display apparatus 100 and icons for at least some of applications installed on the service apparatus 300.

Referring to FIG. 5, the signal processing device 170 may compare a version of a first application (e.g., Netflix) installed on the service apparatus 300 to a version of the first application installed on the image display apparatus 100. Then, when the version of the first application installed on the service apparatus 300 is higher, a graphic object 430 configured to identify an apparatus having the first application with a higher version is installed may be output to overlap an icon 420 of the first application.

In a case of FIG. 5, the first application (e.g., Netflix) is installed on the image display apparatus 100 and the service apparatus 300. Since the version of the first application installed on the service apparatus 300 is higher, the graphic object 430 may be displayed to overlap the icon 420 of the first application, the graphic object 430 indicating that the version of the first application installed on the service apparatus 300 is higher.

When an icon for the first application is selected, the signal processing device 170 may control the network interface module 135 to execute the first application on the service apparatus having the first application with a higher version installed thereon.

In this case, an execution screen of the first application executed on the service apparatus 300 may be displayed on the display 180 of the image display apparatus 100.

The signal processing device 170 may output the execution screen of the first application executed on the service apparatus 300 to the display 180.

Then, when the execution of the first application is terminated, the signal processing device 170 may control the display 180 to output the interface 410 again, the interface 410 being configured to display the icons for the applications installed on the image display apparatus 100 and the service apparatus 300 on one screen again.

For example, when the interface 410 is a home launcher of the image display apparatus 100, the signal processing device 170 may display the home launcher of the image display apparatus 100 again in response to the termination of the first application.

As another example, when the interface 410 is a home launcher of the service apparatus 300, the signal processing device 170 may display the home launcher of the service apparatus 300 again in response to the termination of the first application.

Figure 6:
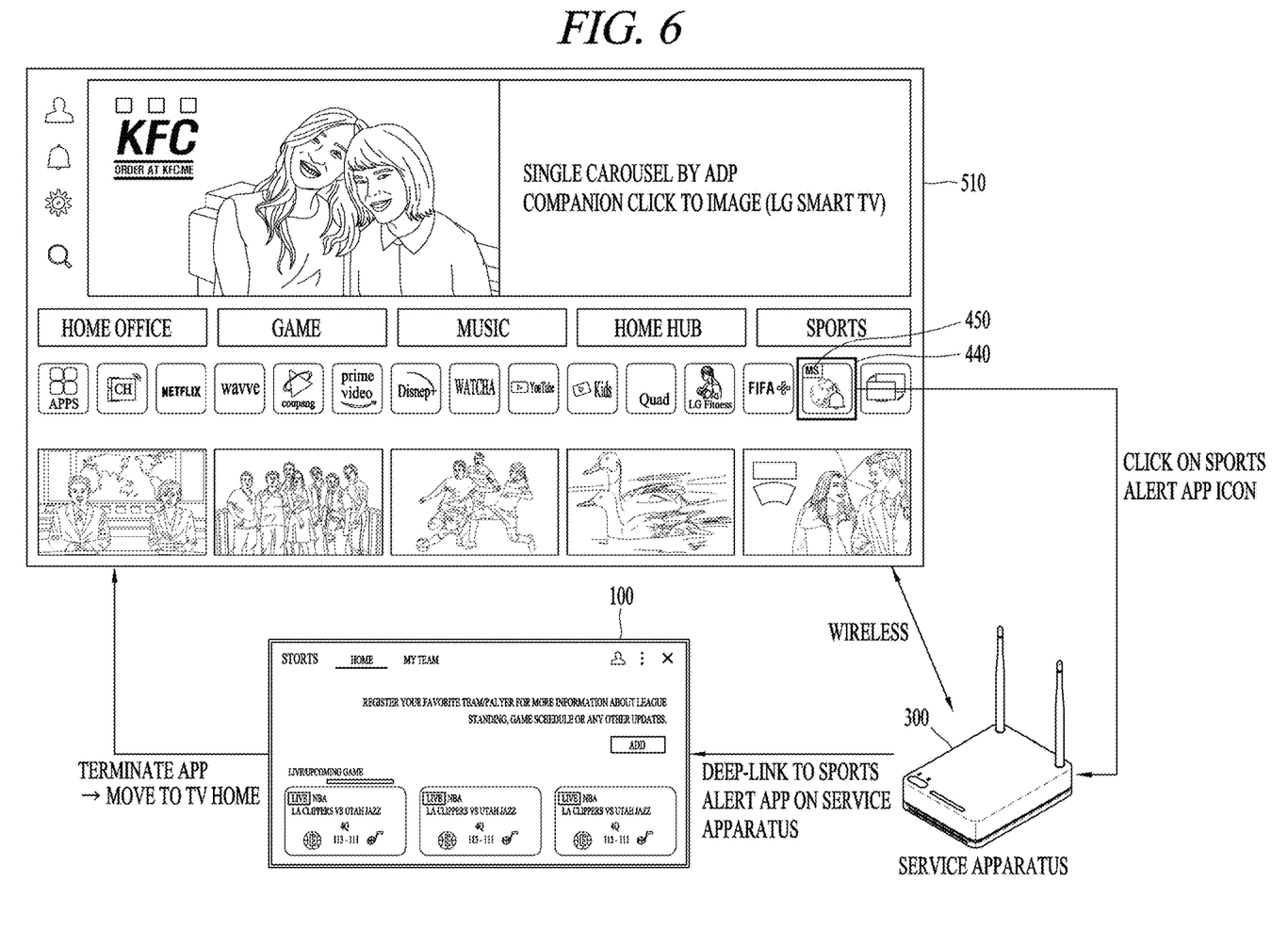

Referring to FIG. 6, the signal processing device 170 may output an interface 510 to the display 180, the interface 510 including icons for at least some of applications installed on the image display apparatus 100 and icons for at least some of applications installed on the service apparatus 300.

The interface 510 may display icons for applications installed only on the service apparatus 300 or the image display apparatus.

For example, as shown in FIG. 6, the signal processing device 170 may output a graphic object 450 to overlap an icon 440 for an application installed only on the service apparatus 300 to identify that the application is installed only on the service apparatus 300.

When the icon 440 overlapping the graphic object 450 is selected, the signal processing device 170 may control the application of the icon 400 to be executed on the service apparatus 300 having the application installed thereon, and output an execution screen of the application to the display 180.

Then, when the application is terminated, the signal processing device 170 may output an interface (a home launcher (a TV home) of the image display apparatus 100 or a home launcher of the service apparatus 300) including the icon 440 to the display 180.

Figure 7:
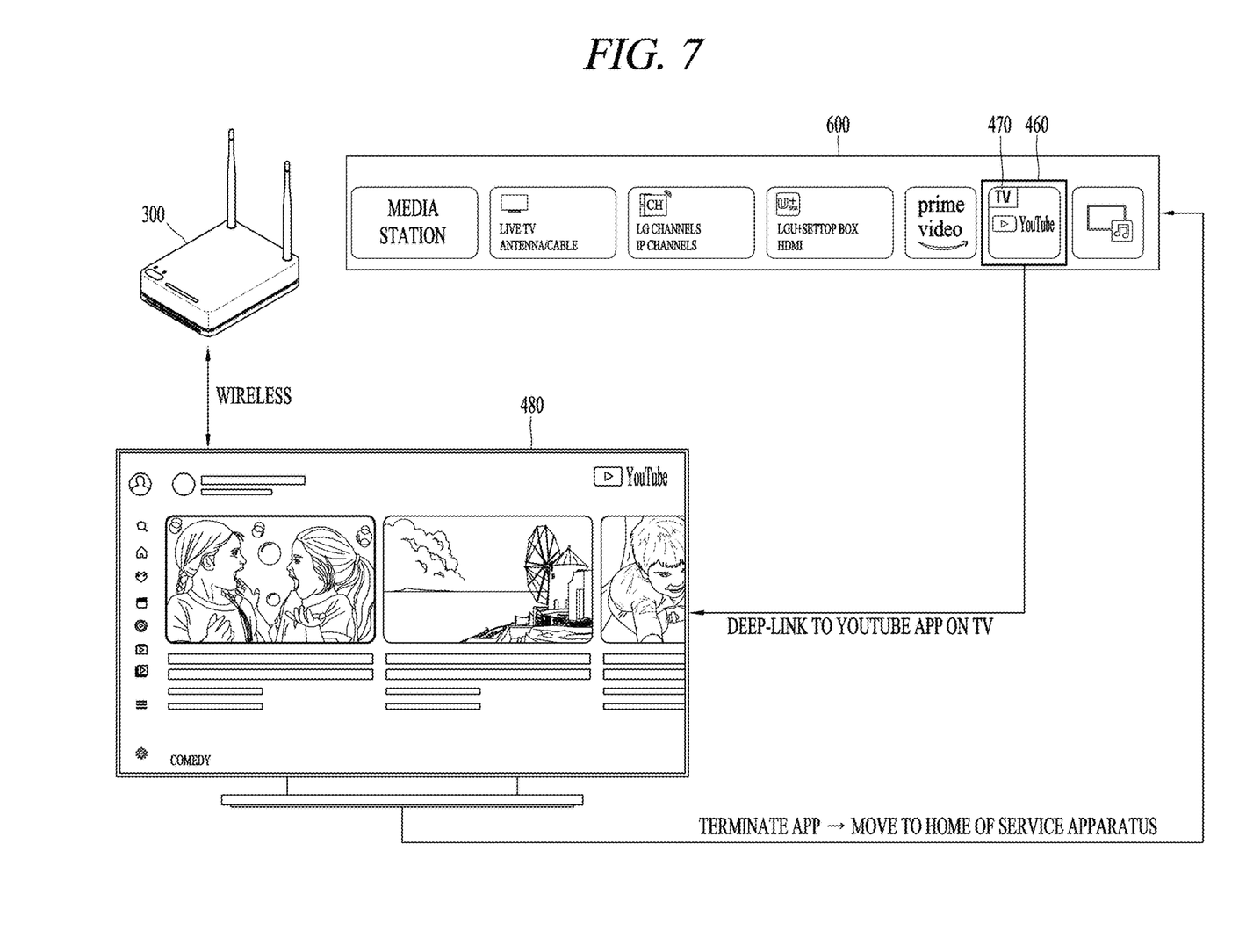

Meanwhile, referring to FIG. 7, the signal processing device 170 may output an interface 600 to the display 180, the interface 600 (a home launcher of the service apparatus 300 or a home screen of the service apparatus 300) including an icon for a second application installed on the service apparatus 300.

In a state when the second application (e.g., YouTube) is installed on the image display apparatus 100 and the service apparatus 300, when a version of the second application installed on the image display apparatus 100 is higher, the signal processing device 170 may output a graphic object 470 to overlap an icon 460 corresponding to the second application and included in the interface 600, the graphic object 470 being configured to identify that a version of the second application installed on the image display apparatus 100 is higher.

When the icon 460 for the second application is selected, the signal processing device 170 may execute the second application on the image display apparatus 100 and output an execution screen of the second application to the display 180.

When the execution of the second application is terminated, the signal processing device 170 may output the interface 600 to the display 180 again, the interface 600 (a home launcher (media station home) of the service apparatus 300) including an icon for the second application installed on the service apparatus 300.

That is, when the execution of the second application is terminated, the signal processing device 170 may output, to the display 180 again, an interface (a home launcher of the image display apparatus 100 or a home launcher of the service apparatus 300) which was being output before the execution of the second application.

At this time, when an application is executed on an apparatus other than the apparatus that is outputting the home launcher, the signal processing device 170 may output an execution screen of the application to the display 180 using the deep linking technology.

The image display apparatus 100 in the present disclosure may determine an apparatus (the image display apparatus 100 or the service apparatus 300) on which an application is to be executed, based on various conditions.

In detail, when a same application with a same version is installed on the image display apparatus 100 and the service apparatus 300, the signal processing device 170 may control the application to be executed on an apparatus that satisfies a preset condition.

For example, when a same application with a same version is installed on the image display apparatus 100 and the service apparatus 300, the signal processing device 170 may control to execute an application installed on an apparatus supporting a higher resolution.

In a case when the image display apparatus 100 provides a resolution of 1080p and the service apparatus 300 provides a resolution of 4K, when a same application with a same version is installed on the image display apparatus 100 and the service apparatus 300, the signal processing device 170 may execute the application on the service apparatus 300 providing a higher resolution.

As another example, when a same application with a same version is installed on the image display apparatus 100 and the service apparatus 300, the signal processing device 170 may control the application to be executed on an apparatus configured to perform communication at a higher transmission rate.

In a case when the image display apparatus 100 provides an Internet transmission rate of 1080 Mbps and the service apparatus 300 provides an Internet transmission rate of 50 Mbps, when a same application with a same version is installed on the image display apparatus 100 and the service apparatus 300, the signal processing device 170 may execute the application on the image display apparatus 100 providing a higher transmission rate.

As another example, when a same application with a same version is installed on the image display apparatus 100 and the service apparatus 300, the signal processing device 170 may control to execute the application installed on an apparatus set to have a priority to execute the application.

In a case when a same application with a same version is installed on the image display apparatus 100 and the service apparatus 300, when the image display apparatus 100 is set to have a priority, the signal processing device 170 may control to execute the application installed on the image display apparatus 100.

As another example, when a same application with a same version is installed on the image display apparatus 100 and the service apparatus 300, the signal processing device 170 may control to execute the application installed on an apparatus with a higher execution frequency.

For example, when the corresponding application has been executed for ten times on the service apparatus 300 and five times on the image display apparatus 100 according to past execution history, the signal processing device 170 may control the application to be executed on the service apparatus with a higher execution frequency.

Figure 8:
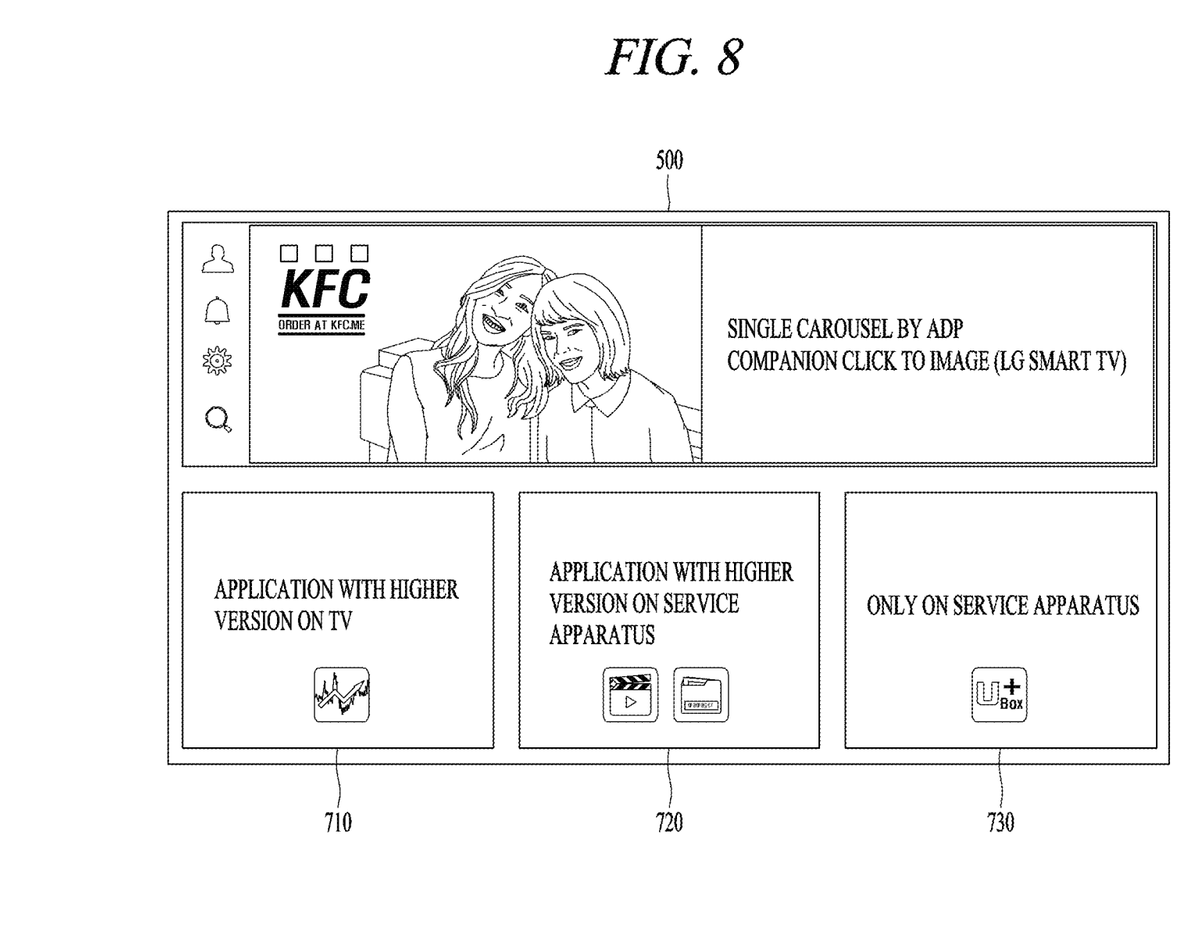

Meanwhile, referring to FIG. 8, based on information about applications installed on the service apparatus 300 and applications installed on the image display apparatus 100, the signal processing device 170 may display icons for the applications by grouping the icons to indicate apparatuses having applications with a higher version installed thereon, among applications installed both on the service apparatus 300 and the image display apparatus 100.

For example, the signal processing device 170 may output an interface (a home launcher) to the display 180, the interface including a portion 710 configured to group and output applications with a higher version installed on the image display apparatus 100 when the applications are installed on both the image display apparatus 100 and the service apparatus 300, a portion 720 configured to group and output applications with a higher version installed on the service apparatus 300 when the applications are installed on both the image display apparatus 100 and the service apparatus 300, and a portion 730 configured to group and output applications when the applications are installed only on the service apparatus 300 (or the image display apparatus 100).

By doing so, a user may intuitively determine an apparatus having an application with a higher version which is to be executed by the user, and determine an input device (an external input) to output to the display 180 of the image display apparatus 100 to execute the application installed on the apparatus having the application with a higher version.

In addition, while the application is being executed on an apparatus having the application with a higher version, the signal processing device 170 may control the network interface module 135 to update a version of an application installed on an apparatus having an application with a lower version.

For example, while a third application is being executed on the service apparatus 300 as a higher version of the third application is installed on the service apparatus 300, the signal processing device 170 may update a version of the third application installed on the image display apparatus 170.

As another example, while a fourth application is being executed on the image display apparatus 100 as a higher version of the fourth application is installed on the image display apparatus 100, the signal processing device 170 may control the network interface module 135 to update a version of the fourth application installed on the service apparatus 300.

According to the present disclosure, a control method of, when a same application is installed on an image display apparatus and a service apparatus, allowing to execute a latest version of the application may be provided.

In addition, the present disclosure may provide a new user interface capable of identifying an apparatus having a higher version of an application installed thereon, among applications installed on the image display apparatus 100 and the service apparatus.

In addition, the present disclosure may provide a user interface capable of displaying applications installed on the image display apparatus and the service apparatus using an optimized method.

In addition, the present disclosure may provide a new control method capable of, while a higher version of an application is being executed, updating a lower version of the application by controlling an apparatus having the lower version of the application installed thereon.

Although embodiments of the present disclosure are illustrated and described, the present disclosure is not limited to the particular embodiments described above and various changes and modifications thereof may be made by those skilled in the art without departing from the essence of the disclosure as claimed in the claims. Such changes and modifications should not be understood as being separate from the technical idea or viewpoint of the present disclosure.

What is claimed is:

1. An image display apparatus comprising:
a display;
a network interface module configured to transceive data with a service apparatus; and
a signal processing device configured to control the network interface module to receive information about a version of an application provided by the service apparatus,
wherein the signal processing device is configured to:
based on a request for executing an application, compares a version of the application installed on the image display apparatus to a version of the application installed on the service apparatus and determine whether the image display apparatus or the service apparatus has a higher version of the application installed thereon, and
control the network interface module to selectively execute the application on an apparatus among the image display apparatus or the service apparatus having the higher version of the application installed thereon based on the determination of whether the image display apparatus or the service apparatus has the higher version of the application installed thereon.

2. The image display apparatus of claim 1, wherein the signal processing is further configured to output a graphic object to overlap an icon of the application indicating the apparatus having the higher version of the application installed thereon.

3. The image display apparatus of claim 2, wherein the request for executing the application is received based on a selection of the icon.

4. The image display apparatus of claim 1, wherein the signal processing device is further configured to controls the display to output an interface including icons for applications installed on the image display apparatus and the service apparatus.

5. The image display apparatus of claim 1, wherein the signal processing device is further configured to output a graphic object to overlap an icon of the application based on the service apparatus having the higher version of the application installed thereon.

6. The image display apparatus of claim 4, wherein the signal processing device is further configured to:
control the network interface module to execute the application on the service apparatus based on the service apparatus having the higher version of the application installed thereon; and
output, to the display, an execution screen of the first-application executed on the service apparatus.

7. The image display apparatus of claim 6, wherein the signal processing device is further configured to, based on termination of the application, controls the display to re-display the interface.

8. The image display apparatus of claim 1, wherein the signal processing device is further configured to output a graphic object to overlap an icon of the application based on the image display apparatus having the higher version of the application installed thereon.

9. The image display apparatus of claim 1, wherein the signal processing device is further configured to control the network interface module to execute the application on one of the image display apparatus or the service apparatus according to a preset condition based on the respective versions of the application installed on the image display apparatus and the service apparatus being a same version.

10. The image display apparatus of claim 9, wherein the preset condition corresponds to which apparatus supports a higher resolution among the image display apparatus and the service apparatus.

11. The image display apparatus of claim 9, wherein the preset condition corresponds to which apparatus performs communication at a higher transmission rate, among the image display apparatus and the service apparatus.

12. The image display apparatus of claim 9, wherein the present condition corresponds to which apparatus is set to have a priority of executing the application; among the image display apparatus and the service apparatus.

13. The image display apparatus of claim 9, wherein the preset condition corresponds to which apparatus has history of a higher frequency of executing the application; among the image display apparatus and the service apparatus.

14. The image display apparatus of claim 1, wherein, based on information regarding versions of applications installed on the service apparatus and the applications installed on the image display apparatus, the signal processing device is configured to group application icons to be displayed to indicate the apparatus having higher versions of the respective applications.

15. The image display apparatus of claim 1, wherein, while the application is being executed on the apparatus having the higher version of the application installed thereon, the signal processing device is configured to cause update of the application on a remaining apparatus among the image display apparatus and the service apparatus having a lower version of the application installed thereon.

* * * * *